United States Patent [19]

Willis

[11] Patent Number: 4,676,436

[45] Date of Patent: Jun. 30, 1987

[54] ROCKET MOTOR NOZZLE EXTENSION SYSTEM

[75] Inventor: Kenneth E. Willis, Litchfield Park, Ariz.

[73] Assignee: Unidynamics Phoenix, Inc., Phoenix, Ariz.

[21] Appl. No.: 667,853

[22] Filed: Nov. 2, 1984

[51] Int. Cl.⁴ .............................................. F02K 1/09
[52] U.S. Cl. ............................... 239/265.33; 60/271; 285/24; 285/302; 403/104; 403/109
[58] Field of Search ...................... 239/265.33, 265.37, 239/265.35; 60/271; 403/104, 109; 285/24, 302

[56] References Cited

U.S. PATENT DOCUMENTS

| | | | |
|---|---|---|---|
| 2,473,470 | 6/1949 | Fall | 285/302 |
| 3,183,664 | 5/1965 | Divone | 239/265.33 |
| 3,346,186 | 10/1967 | Fulton et al. | 239/11 |
| 4,162,040 | 7/1979 | Carey | 239/265.33 |
| 4,169,555 | 10/1979 | Crowe | 239/265.33 |
| 4,184,238 | 1/1980 | Carey | 239/265.43 |
| 4,213,566 | 7/1980 | Miltenberger | 239/265.43 |
| 4,349,155 | 9/1982 | Donguy | 239/265.43 |
| 4,383,407 | 5/1983 | Inman | 239/265.33 |
| 4,489,889 | 12/1984 | Inman | 239/265.33 |

Primary Examiner—Andres Kashnikow
Assistant Examiner—Michael J. Forman
Attorney, Agent, or Firm—Cahill, Sutton & Thomas

[57] ABSTRACT

A system for supporting and deploying a rocket motor nozzle extension that is stowed in concentric overlapping relationship with the nozzle. The system includes a plurality of articulated frames having first and second pairs of links pivotally connected, respectively, to the nozzle and to the nozzle extension. Articulation for each frame is provided by a knee hinge connecting the two pairs of links at their outer ends, thereby permitting the pairs of links to swing apart. A retractable cable looped around the knee hinges of each of the frames is capable of forcing the hinges inwardly toward the nozzle and nozzle extension to force the pairs of links of each frame apart and to move the nozzle extension to a deployed position at the end of the nozzle. Retraction of the cable is accomplished by a motor driven spool on which the cable is wound. Shearable locking pins in the knee hinges of the frames lock the system to hold the nozzle extension in its stowed position until the system is activated to deploy the extension.

7 Claims, 7 Drawing Figures

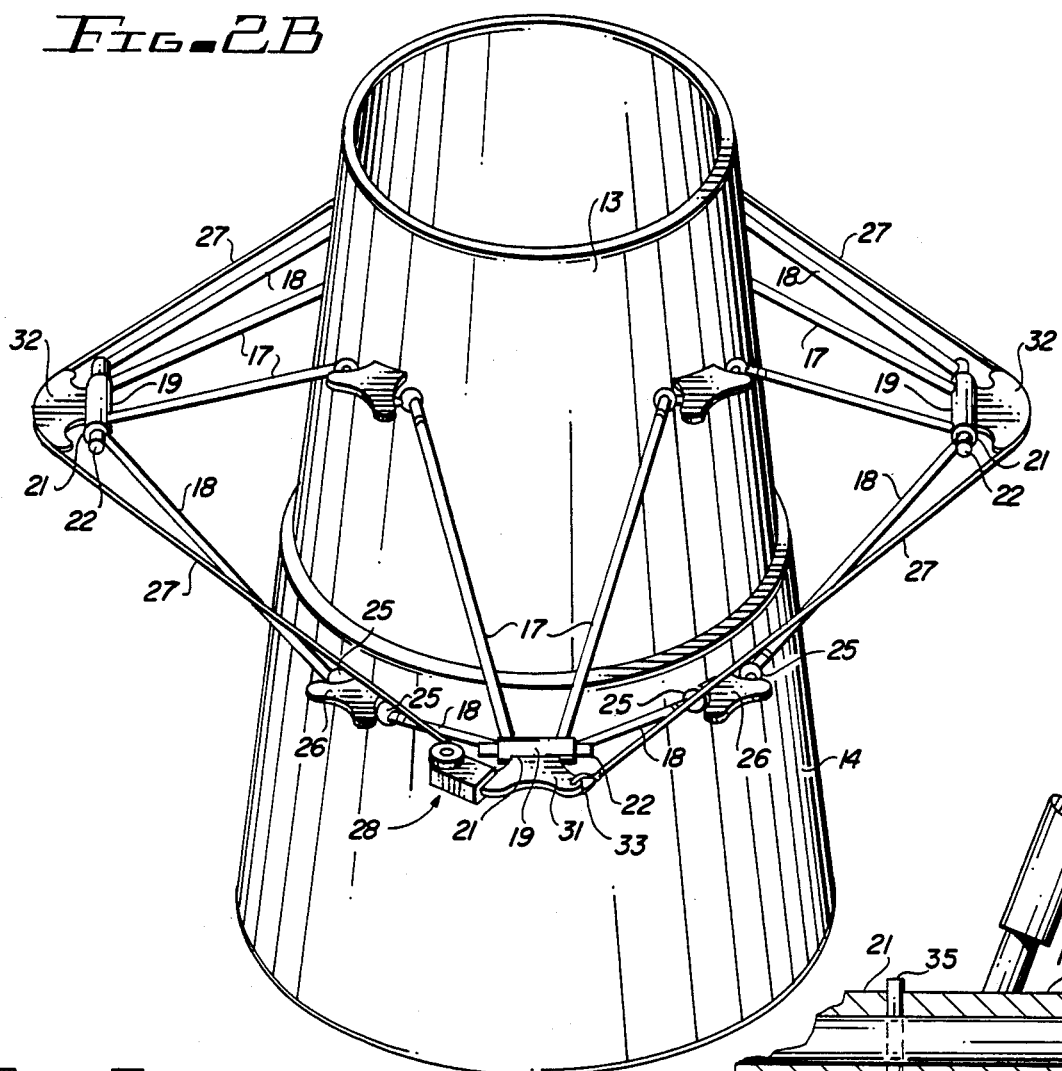
FIG.-2B
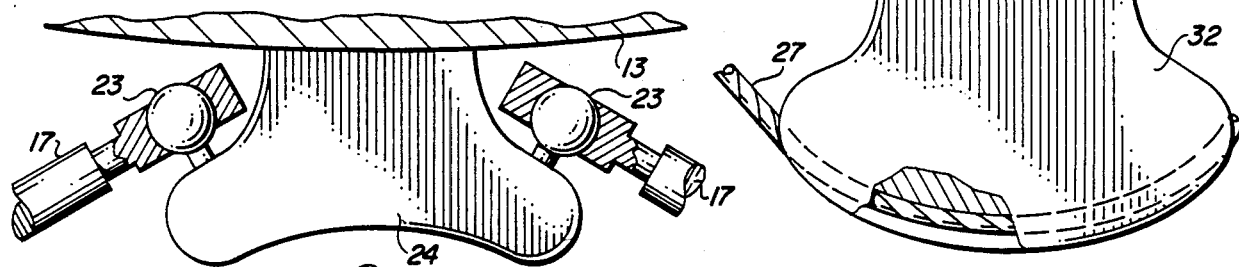
FIG.-3
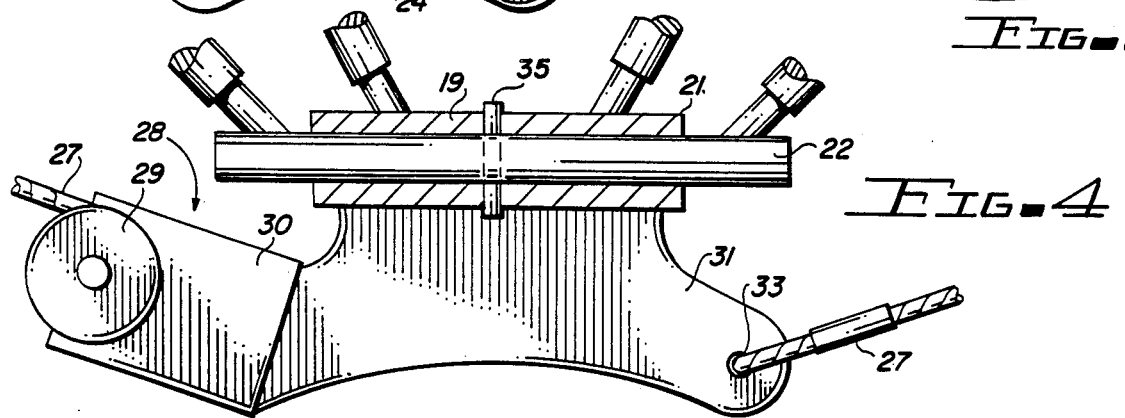
FIG.-4
FIG.-5

ROCKET MOTOR NOZZLE EXTENSION SYSTEM

TECHNICAL FIELD

This invention is concerned with improving the efficiency of rocket motors employed to propel missiles.

BACKGROUND ART

To obtain maximum thrust efficiency from a rocket engine it is necessary to equip the engine with a divergent exit nozzle configured for the ambient pressure in which the rocket operates. Rocket engines propelling second and later stages of missiles are required to operate at low ambient pressures and must be equipped with exit nozzles of substantial length and exit diameter.

In order to make maximum utilization of the valuable space within the body of a missile and to reduce its overall length it has been proposed that the nozzle for the second and possibly later stages be made in sections and collapsed, or telescoped, on its self to reduce its length. This arrangement requires that the nozzle be provided with a structure for supporting the telescope sections and for propelling them to their extended positions when the rocket engine is fired.

U.S. Pat. No. 4,213,566, granted July 22, 1980, to L. E. Miltenberger for "Nested Cone Extendible Nozzle System for a Rocket Motor" discloses a system of longitudinal tracks for supporting and allowing sliding movement of the nozzle sections in relation to each other. The nozzle sections are deployed by aerodynamic drag panels extending into the exhaust path of the rocket. U.S. Pat. No. 3,346,186, granted Oct. 10, 1967, to D. L. Fulton et al, for "Extensible Rocket Nozzle Comprised of a Coated Flexible Mesh Subsequently Deployed and Heated to Become Impermeable", and U.S. Pat. No. 4,184,238, granted Jan. 22, 1980, to L. F. Carey for "Method of Making an Extendible/Expandable Nozzle for Rocket Engines" propose that the extendable portion of the nozzle be formed of flexible material which can be collapsed back on a nozzle base. The skirt-like extensions of the nozzle structures of these patents are supported and deployed by a plurality of fluid actuated piston and cylinder devices mounted on the nozzle. A somewhat different approach to a foldable nozzle is disclosed in U.S. Pat. No. 4,349,155, granted Sept. 14, 1982 to P. Donguy for "Unfoldable Divergent Nozzle for a Rocket Engine". This patent suggests that the nozzle wall be divided into a multiplicity of panels, or petals, that are articulated, i.e. hingedly connected, in such a manner that the panels can be folded against each other to shorten the nozzle.

The principal shortcoming of the nozzle section supporting systems disclosed in the prior art is that none of these systems has inherent structural stability. The systems are composed of a plurality of components which do not interact to support and guide the nozzle sections. The nozzle sections are, of course, subjected to severe transient loads from aerodynamic and inertial forces. To handle such loads with the prior supporting systems components having considerable bulk and weight are employed. Thus, as to each of these prior structures, rather massive components are required in order to support the nozzle segments, propel them along the desired deployment paths and position them correctly in their extended positions.

Another disadvantage of these prior supporting systems—particularly those employing a plurality of independent actuating mechanisms—is that simulataniety of motion of all portions of each extendable nozzle section is not assured. If one actuator acts more quickly than another actuator the nozzle section can become canted, or misaligned and full deployment may not be achieved.

There continues to be a need, therefore, for a light weight and reliable system for supporting and deploying extendable nozzle sections.

DISCLOSURE OF THE INVENTION

The support structure of this invention basically comprises a plurality of articulated frames disposed about the periphery of the nozzle and the extension therefor and which are interconnected by two sets of support members carried respectively by the nozzle and the nozzle extension. Each frame is composed of two pairs of links. One pair of links has the inner ends of the links pivotally connected to adjacent support members on the nozzle. The links of this pair extend outwardly from the nozzle and have their outer ends rigidly connected. The other pair of links of each frame have their inner ends pivotally connected to adjoining support members on the nozzle extension and have their outer ends rigidly connected together. The connected outer ends of the two pairs of links are hingedly connected to form the articulation for the frame and to permit the two pairs of links to swing away from each other about the axis of the hinge.

The support mechanism is actuated to propel the nozzle extension from its stowed to its deployed position by means of a retractable cable circumscribing, or looped around, the several hinge connections of the frames. When the cable is retracted, or foreshortened, it propels the hinge regions of the frames inwardly toward the nozzle and the nozzle extension with the result that the links in the frames are caused to move apart and separate the support members on the nozzle extension from the support members on the nozzle, thereby deploying the nozzle extension. A single warm gas driven cable take-up device is used to foreshorten the cable.

Among the advantages of the support structure of this invention is the fact that the structure is inherently stable and all of the movable components of this system can only move in unison and can only impart unidirectional forces to the nozzle and nozzle extension. The only forces imparted to the nozzle and nozzle extension are those required to axially move the nozzle extension in relation to the nozzle. All other forces generated in the support system during its actuation are retained in the system and not imparted either to the nozzle or the nozzle extension. This means that the nozzle components, which frequently contain frangible ceramic materials, are not subject to undue distorting loads during deployment of the nozzle extension.

Another significant characteristic of the support system of this invention is that the variety of disturbing forces acting on the nozzle and the nozzle extension as a result of aerodynamic and inertial forces, including assymetric loads imposed on these components during or after deployment, are absorbed by the supporting system essentially as compression or tension loads in the links of the frame members. Such loads can be readily absorbed by light weight tubular link members, so the overall weight of the support system can be held to an absolute minimum.

BRIEF DISCRIPTION OF THE DRAWINGS

The invention is described in greater detail hereinafter by reference to the accompanying drawings wherein:

FIG. 2B is a view similar to 2A, but showing the nozzle extension in its deployed position;

FIG. 3 is an enlarged plan view, partially in section, showing a support member employed in the support structure shown in FIGS. 2A and 2B;

FIG. 4 is a plan view, partially in section, illustrating a hinge connection employed in the support structure of the invention; and FIG. 5 is a plan view, partially in section, showing another hinge member employed in the support structure of the invention.

BEST MODE FOR CARRYING OUT THE INVENTION

Figure 1A:
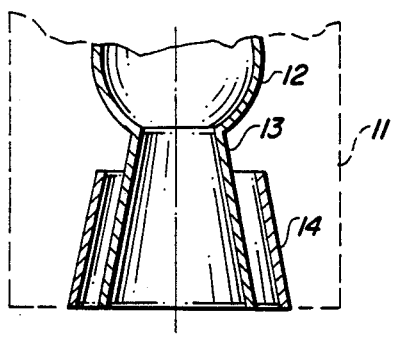
FIG. 1A is a diagramatic representation, in section, of the exit end of a rocket engine having a segmented nozzle with the nozzle extension in a stowed position.
Figure 1B:
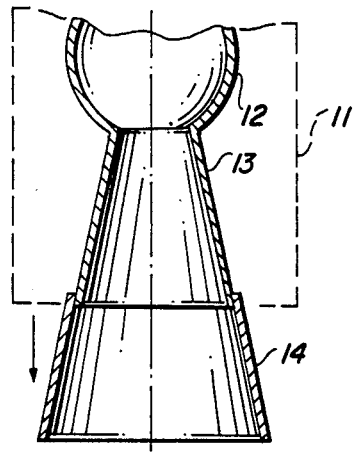
FIG. 1B is a diagramatic illustration similar to FIG. 1A showing the nozzle extension in its deployed position.

FIGS. 1A and 1B diagramatically illustrate the task to be performed by a rocket motor nozzle extension deployment system. To reduce the overall length of a missile body 11 housing a rocket motor 12, the rocket motor nozzle 13 is provided with a nozzle extension 14 which can be telescoped over the nozzle 13 in its stowed position as shown in FIG. 1A. When the rocket motor 12 is fired, nozzle extension 14 must be moved axially to the end of nozzle 13 as shown in FIG. 1B, to increase the effective length of the nozzle and permit the rocket motor to be operated more efficiently. This invention is concerned with a system for supporting nozzle extension 14 in its stowed position of FIG. 1A and for propelling the nozzle extension to its deployed position of FIG. 1B.

This type of deployment system is particularily beneficial for use in the second and later stages of ballistic missiles the overall length of which is to be held to a minimum.

Figure 2A:
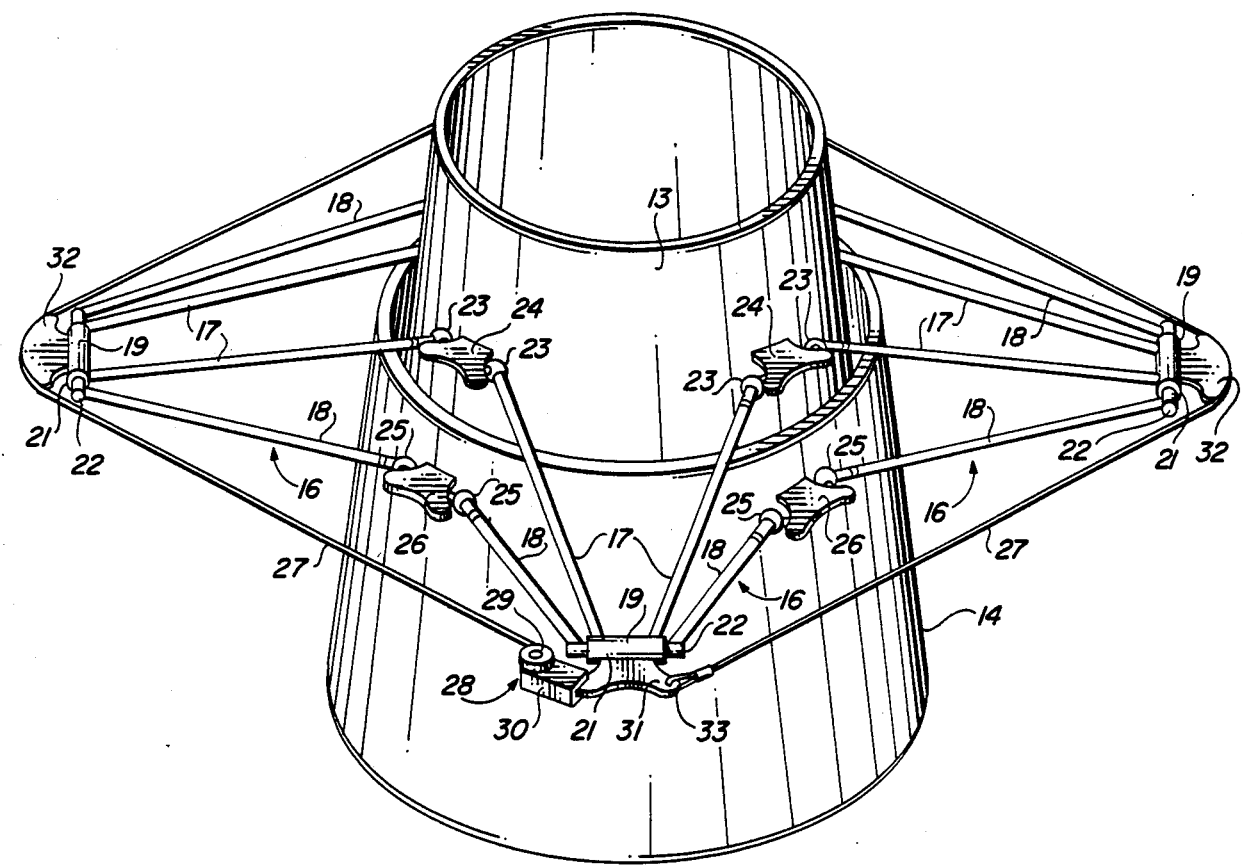
FIG. 2A is a perspective view of a rocket nozzle equipped with the support structure of this invention and showing the nozzle extension in its stowed position.

The supporting and deployment system of this invention is illustrated in FIGS. 2A and 2B. This system includes a plurality of articulated frames, indicated generally by the reference numeral 16, which are disposed equidistant around nozzle 13 and nozzle extension 14. The system illustrated has four such frames, only three of which are visible in FIGS. 2A and 2B. The system can be constructed, however, with more or less such frames. Each articulated frame 16 has two pairs of links, an upper pair 17 and a lower pair 18. The upper pair of links 17 have their outer ends rigidly connected together and to sleeve portion 19 of frame knee hinge 21. The outer ends of the lower pair of links 18 are also rigidly connected together and are also connected to a pin portion 22 of knee hinge 21. The construction is such that each frame 16 is articulated by its knee hinge 21 so that its respective upper and lower pairs of links 17 and 18 can swing toward and away from each other about the axis of knee hinge 21.

The inner ends of upper pair of links 17 of each frame 16 are connected by means of ball joints 23 to a plurality of support members, or brackets, 24, (see FIG. 3). Support members 24 are mounted on and spaced equidistant around nozzle 13. These support members are disposed in a plane normal to the axis of nozzle 13 and they are equal in number to the number of articulated frames 16 so that the upper pair of links 17 of each frame connect adjoining support members 24.

There are a like number of nozzle extension support members, or brackets, 26 carried by the nozzle extension 14 and positioned in longitudinal alignment with the nozzle support members 24. The lower pair of links 18 of each frame 16 have their inner ends connected to adjoining extension support members 26 by means of ball joints 25.

The support assemblage of articulated frames 16 interconnected at the inner ends of their link pairs 17 and 18 by the support members or brackets 24 and 26 constitutes a support structure for nozzle extension 14 which has inherent structural stability. By this it is meant that movement of any component of the support structure can only take place if there is a corresponding movement of all other components making up the support structure. For example, movement of a knee hinge 21 of one of the articulated frames 16 toward nozzle 13 and nozzle extension 14 can take place only if there is a corresponding movement of all of the other knee hinges in the direction of the nozzle and nozzle extension. When these knee hinges 21 are moved toward the nozzle 13 the link pairs 17 and 18 of each frame 16 are spread apart with the result that all of the support members 26 on the nozzle extension 14 are moved away from the support members 24 on the nozzle and the nozzle extension 14 is moved from its stowed position shown in FIG. 2A to its deployed position shown in FIG. 2B.

The nozzle extension supporting structure is actuated to open the articulated frames 16 and move the nozzle extension 14 from its stowed to its deployed position by applying radially inwardly directed forces to each of the knee hinges 21 of the frames. The mechanism for accomplishing this is a retractable cable 27 looped around, or circumscribing, the knee hinges 21 and take-up means indicated at 28 for shortening cable 27 to apply the inwardly directed forces to knee hinges 21. Take-up means 28 consists of rotatable spool 29 and a motor 30 mounted on bracket 31 carried by a knee hinge 21 of one of the frames 16 (see FIG. 4). One end of the retractable cable 27 is wrapped around spool 29. Cable 27 circumscribes the articulated frames 16 passing through guides 32 carried by each of the knee hinges of the other frames 16 (see FIG. 5). The other end of cable 27 is connected at 33 to bracket 31 which supports take-up means 28. When motor 30 is energized it rotates spool 29 to retract, or foreshorten, cable 27 to move frame knee hinges 21 inwardly to deploy nozzle extension 14 as discussed above.

Virtually any type motor 30 can be used with the nozzle extension system of this invention. However, a warm gas actuator of the type used in other missile applications is particularly suited for driving the cable take-up spool 29. In a warm gas actuator a combustable propellant is ignited electrically to generate a gas which, acting through a piston, provides a force to rotate the take-up spool. Warm gas actuators are of relativly low weight and yet are capable of producing tremendous actuating forces. Such devices are well known in the art and detailed description therefore is not deemed necessary here.

It is desirable that means be provided for locking the nozzle extension system while the nozzle extension 14 is in its stowed position. This is to prevent undesirable movement of the nozzle extension 14 during first stage rocket acceleration and staging. For this purpose each frame knee hinge 21 is provided with a shear pin 35 which fits snugly in alligned openings provided in the sleeve portion 19 and the pin portion 22 of each hinge 21, (see FIGS. 4 and 5). As mentioned previously, the extension system of this invention has inherent structural stability so that with knee hinges 21 locked by shear pins 33 no movement can take place for any of the components of the system. However, when cable 27 is foreshortened by take-up means 28 the initial forces applied to knee hinges 21 are sufficient to shear pins 35 to permit movement of the components of the system.

The nozzle extension system of this invention has several highly desirable operating characteristics. Inherent structural stability has been mentioned and is one of those characteristics. Movements of all of the components in this system are interrelated. This means, for example, that all of the support members 26 attached to the nozzle extension 14 are caused to move simultaneously and precisely the same distances and at the same speed. Precision deployment of the nozzle extension 14 is thereby assured.

Another characteristic of this inherently stable system is that the only forces applied to nozzle 13 and nozzle extension 14 during deployment are longitudinal forces required to effect deployment movement of the nozzle extension. No compressive forces, which might distort and damage the frangible nozzle sections are generated by the extension system. It is further to be noted that any loads, including assemetrical loads, applied to nozzle extension 14 are absorbed by the frame link pairs 17 and 18 in either tension or compression. Thus, light weight tubular members can be utilized to form these links and because the link pairs 17 and 18 constitute a principal structure of the extension system the entire system is light weight.

It will also be noted that with spreading of the link pairs 17 and 18 as the extension 14 is deployed with a constant rate of cable take-up the extension slows as it approaches the end of its travels. This minimizes shock when the extension 14 mates with the end of the nozzle 13.

What is claimed is:

1. In a system for supporting and deploying a nozzle extension on a rocket engine nozzle, said extension being movable from a stowed position in which it is concentrically disposed in overlapping relationship with the nozzle to a deployed position at the exit of the nozzle, the path of movement of said extension being along and concentric with the longitudinal axis of the nozzle, the improvement comprising:
    a plurality of articulated frames disposed around and connecting said extension to said nozzle, each of said frames comprising:
    a first pair of links having their inner ends pivotally connected to said nozzle and having their outer ends rigidly connected together;
    a second pair of links having their inner ends pivotally connected to said extension and having their outer ends rigidly connected together; and
    hinge means connecting the outer ends of the first pair of links to the outer ends of the second pair of links;
    and means for moving the hinge means of each of said frames in a direction toward the axis of the nozzle to spread the first and second pairs of links of each frame with respect to each other to deploy said extension.

2. The system of claim 1 wherein the means for moving the hinge means includes a retractable cable looped around hinge means of all of said frames.

3. The system of claim 2 including motor driven spool means for retracting said cable.

4. The system of claim 3 wherein said motor driven spool means is carried by the hinge means of one of said frames.

5. The system of claim 1 including means for releasably locking the hinge means of at least one of said frames against movement when the extension is in its stowed position.

6. The system of claim 5 wherein said locking means is a shear pin disposed in said hinge means.

7. In a system for supporting and deploying a nozzle extension on a rocket engine nozzle, said extension being movable from a stowed position in which it is concentrically disposed in overlapping relationship with the nozzle to a deployed position at the exit of the nozzle, the path of movement of said extension being along and concentric with the longitudinal axis of the nozzle, the improvement comprising:
    a plurality of support members spaced equidistant around and mounted on said nozzle, said support members being disposed in a plane normal to the axis of the nozzle;
    a like number of support members mounted on said extension, the support members on the extension being disposed in a plane normal to the axis of the nozzle and being longitudinally aligned with respective support members on the nozzle;
    a plurality of articulated frames equal in number to the number of support members on said nozzle connecting adjacent pairs of support members on said nozzle adjacent pairs of support members on said extension, each of said frames comprising;
    a first pair of links having their inner ends pivotally connected respectively to adjacent support members on said nozzle and having their outer ends rigidly connected together;
    a second pair of links having their inner ends pivotally connected respectively to adjacent support members on said extension and having their outer ends rigidly connected together; and
    hinge means connecting the outer ends of the first pair of links to the outer end of the second pair of links;
    and means for moving the hinge means of each of said frames in a direction toward the axis of the nozzle to spread the first and second pairs of links of each frame with respect to each other to deploy said extension.

* * * * *